Patented Apr. 27, 1937

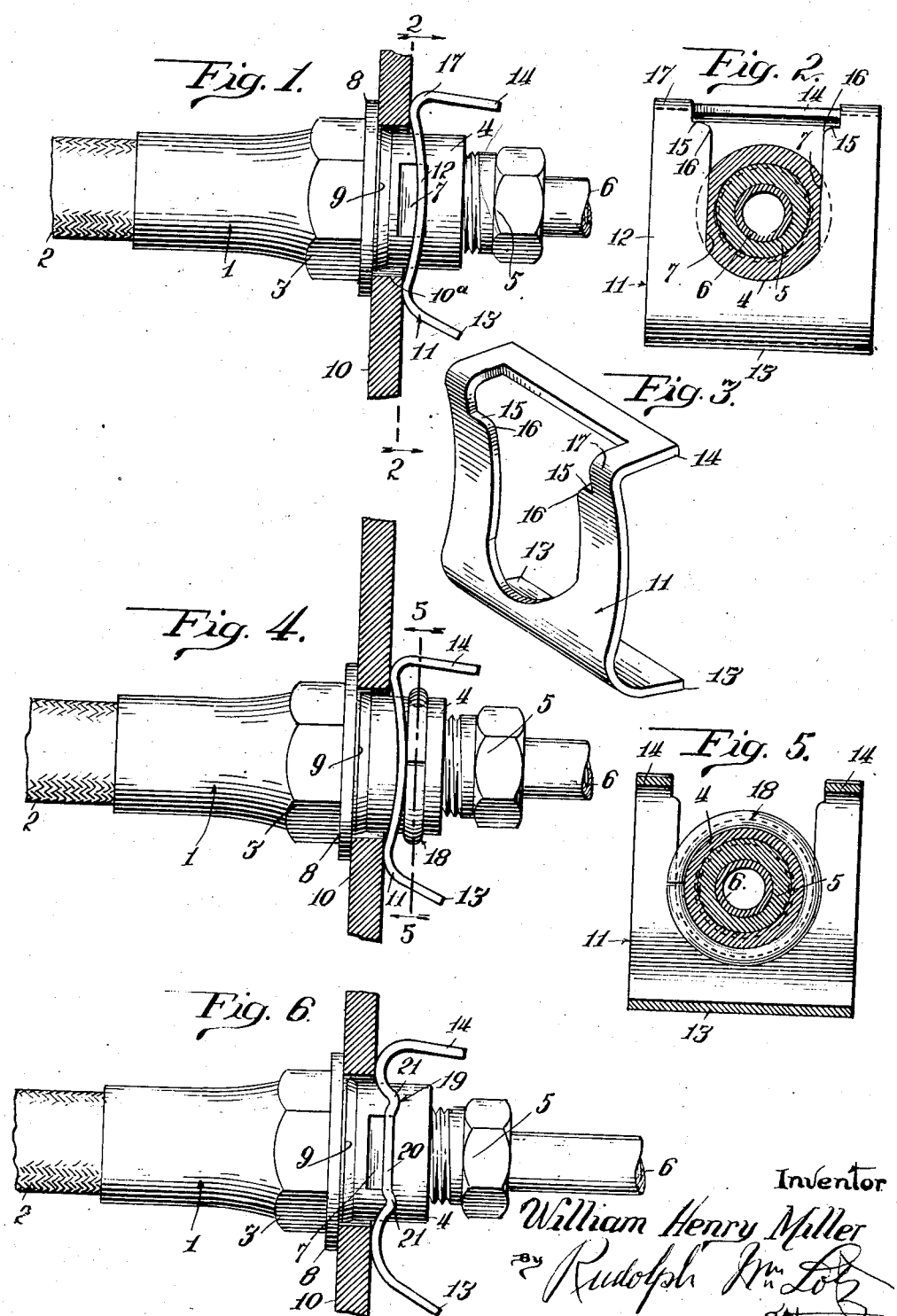

2,078,453

UNITED STATES PATENT OFFICE 2,078,453

MOUNTING FOR HOSE COUPLINGS

William Henry Miller, Royal Oak, Mich., assignor to The Flex-O-Tube Co., Detroit, Mich., a co-partnership Application January 20, 1936, Serial No. 59,887

1 Claim. (Cl. 248—56)

In automotive vehicles and the like, metal tubing such as copper and bronze tubing, is employed for conveying oil and gasoline from sources of supply to the engine bearings and engine cylinders, respectively.

It has been found desirable in almost all instances to limit the lengths of the metal tubing because, during travel of the vehicle, said tubing is subjected to strong vibration and whipping action which causes the same to crystallize and crack, and, therefore, long lengths of said tubing, especially in instances where the same cannot be properly supported at points between its ends, have been found to be relatively dangerous. Accordingly, it has become almost universal practice to incorporate into such vehicles, including aircraft, conduits which consist in part of metal tubing and in part of flexible hose, the said tubing and hose being connected with each other by means of a separable coupling. The latter is necessarily heavy and, therefore, must be supported firmly in order to prevent the same from placing a load and stresses on the tubing which soon cause fracture thereof.

In such vehicles it is customary to provide a bracket upon which the coupling is mounted and is held rigid. Requisite repairs and replacements require that the coupling shall be demountable from the bracket and replaceable thereon with ease and dispatch.

The object of the present invention is to provide a means for detachably mounting the coupling upon the said bracket of the vehicle so as to meet the aforesaid requirement and to provide a structure which is cheap, durable and efficient and which will prevent any accidental detachment of the coupling from the bracket, or permit same to work loose and thus become movable relatively to the bracket responsively to the shocks resulting from travel of the vehicle over rough roads, defective pavements, etc.

Suitable embodiments of the invention are illustrated in the accompanying drawing, wherein Fig. 1 is a side elevation of a coupling and means for detachably securing the same to a bracket of a vehicle, the latter being shown in fragmentary section and which illustrates the preferred embodiment of the invention.

Fig. 2 is a sectional view on the line 2—2 of Fig. 1.

Fig. 3 is a perspective view of a flexible key employed to effect detachable mounting of the coupling upon the bracket.

Fig. 4 is a view similar to Fig. 1 showing an alternative embodiment of the invention.

Fig. 5 is a sectional view taken on the line 5—5 of Fig. 4.

Fig. 6 is a view similar to Figs. 1 and 4 illustrating another alternative embodiment of the invention.

The coupling illustrated in Fig. 1 comprises a body portion (1) which is engaged permanently with an end portion of a flexible conduit (2), said body portion (1) consisting of a contracted shell which engages an end portion of the hose (2) and which extends to a hexagonal portion (3) of the structure to which a wrench may be applied.

Rigid or integral with the body portion of the coupling is a nipple (4) which, in the instance illustrated, is cylindrical externally and is internally threaded to receive the member (5) of a compression pipe coupling which connects the end portion of a metal tube (6) with the nipple (4). Said compression pipe coupling may be of any of the several conventional types commonly employed in the automotive industry and is exemplified in Letters Patent to I. Cowles, No. 1,791,121 and in the well-known "SAE" type of coupling.

In the instance illustrated in Fig. 1, the nipple (4) is provided externally on diametrically opposite sides thereof with a pair of grooves (7) extending transversely to the axis of the coupling and which are spaced from the hexagonal portion (3) of the coupling. The said nipple (4) is equipped with a washer (8) which, preferably, is driven upon a cylindrical surface or shoulder (9) of the coupling against said hexagonal portion (3) to effect what is known as a "drive fit" and thus becomes rigidly engaged with the coupling body and constitutes a collar which bears upon one face of the bracket (10) of the vehicle.

The bracket (10) is provided with an aperture (11) which generally is circular and is of larger diameter than the nipple (4) and of smaller diameter than said hexagonal portion in some instances and of said washer or collar (8) in all instances. The spacing of the recesses (7) from the opposed face of the washer or collar (8) is such that the nearest adjacent wall of a groove (7) to said washer or collar (8) is spaced from said collar a distance less than the thickness of the bracket (10). The other side walls of the grooves (7) are spaced from the opposed face of the bracket (10) a distance appreciably greater than the thickness of metal of which the key (11) is composed. The latter constitutes a flexible member which comprises a bowed middle portion (12) and a pair of upturned end portions or flanges (13) and (14), there being a longitudinal slot (15) extending from a point in said middle portion (12) adjacent the flange (14) through the remainder of said middle portion (12) and into the flange (13).

The said slot (15) is widened from a point in the middle portion (12) adjacent the flange (13) and to its terminus in said flange. The widening of said slot provides a pair of shoulders (16) opposed to the plane of the flange (14), said shoulders being provided with arcuate inner corners. The convex face of the middle portion (12) is opposed to the extremities of the flanges (13) and (14).

The said slot (15) extends to a height from the bend (17) in the key at which the middle portion (12) joins the flange (13) to a height within the flange (13) appreciably greater than the distance between the outer side walls of the recesses (17) to the outer end of the nipple (4), so that, when the compression pipe coupling member (5) is disconnected from the nipple (4), the key may be forced into place and into engagement with the said bracket (10) and the said recesses (7) by moving said key vertically upwardly in the instance of Fig. 1.

It will be obvious, of course, that the portion of the nipple (4) disposed beyond the nearest contiguous face of the bracket (10) may pass through the slot (15) of the flange (14). In effecting this positioning of the key (11), the said middle portion (12) of the key will be flexed from normal position and will exert a pressure against the outer side walls of the recesses (7) which will cause the said washer or collar (8) to hug the other face of the bracket (10).

After the said key (11) has been disposed in the position shown in Fig. 1, the compression pipe coupling member (5) is secured to the nipple (4) and, when so secured, the same becomes opposed to the outer end portion of the flange (14) so that in the event that said key should slip downwardly from the position shown in Fig. 1, the said compression pipe coupling member (5) will act as a stop to prevent said key from becoming disengaged from the nipple (4) and bracket (10). The structure is also designed so that in the event that the flange (14) of the key (11) should become engaged with the said member (5), the middle portion of said key will still exert sufficient action upon the bracket (10) and outer walls of the recesses (7) to hold the coupling firmly in place on the bracket.

Obviously, the recesses (7) present diametrically opposed shoulders for engagement with the middle portion of the key (11) and such shoulders may also be provided as shown in Figs. 4 and 5. In said Figs. 4 and 5, the nipple (4) of the coupling is shown to be provided with an annular groove in which a split ring (18) of suitable metal is sprung, the depth of the groove being appreciably less than the diameter of the wire of which said ring (18) is composed and which consequently provides an annular external shoulder on the nipple (4) against which the bowed middle portion of the key (11) bears to perform its functions in the same manner as is described and illustrated with respect to the structure of Figs. 1 and 2. Said annular shoulder presents the advantage that the coupling may occupy any position relatively to the bracket (10) circumferentially of the coupling, and the key (11) may, accordingly, be slipped into place in any desired direction, whereas in the structure of Fig. 1, the said key must be positioned in accordance with the position of the recesses (7) relatively to the bracket (10). However, the structure of Fig. 1 is cheaper than that of Fig. 4 and is preferable for that reason.

In Fig. 6, the key (19) corresponds to the key (11) of Figs. 1 and 4. The coupling structure is identical with that of Fig. 1. Said key (19) is however, provided with a substantially straight middle portion (20) which corresponds to the portion (12) of Fig. 3. Said straight portion terminates in arcuate formations (21), the crowns of which are spaced apart sufficiently to receive between them the arcuate shoulders of the recesses (7) or the arcuate portions of the ring (18), respectively, which the said middle portion (20) is adapted to engage.

In the structure of Fig. 6, the upper of the formations (21) must be sprung through the recesses (7) of the coupling in an obvious manner and thus the wall of the groove which is engaged by the middle portion (18) will become disposed between the formations (21) and will resist movement of the key from the position shown in Fig. 6 in an obvious manner.

The invention resides essentially in the flexible key illustrated and described herein which cooperates with a removable part of the conduit coupling to hold said key against removal. The particular advantage incident to the key of this invention is that it is very much more easily mounted in place and removed than is the case with other types of keys employed for similar purposes, wherein the side portions bordering the slot must be sprung apart in mounting and removing the key.

I claim as my invention:

The combination with two separable members of a tube coupling, of a supporting plate provided with an opening through which one of said coupling members projects, a stop formation on said member engaged with one face of said plate for limiting movement of said member relatively to said plate in one direction, a formation on the said coupling member opposed to and spaced from the other face of said plate, and disposed adjacent one end of said coupling member, a companion coupling member detachably engaged with the last-mentioned end of the first-named coupling member and a key member comprising a substantially U-shaped plate engaged with said supporting plate and equipped with a slot extending from a point in the middle portion contiguous to one of its flanges through a portion of its other flange, the end portion of the said slot disposed within the last-named flange being of dimensions permitting the end portion of the first-named coupling member from said formation thereof to its extremity to pass through said flange when said companion coupling member is detached from said first-named member, the portion of said slot lying within the middle portion of said plate being of a width to engage said formation of said first-named member for preventing withdrawal thereof through said opening in said plate, said companion coupling member when attached to said first-named member cooperating with said slotted flange of said key member to prevent dis-engagement of the latter from said coupling.

WILLIAM HENRY MILLER.